United States Patent [19]

Blessin

[11] 3,889,109

[45] June 10, 1975

[54] DATA COMMUNICATIONS SUBCHANNEL HAVING SELF-TESTING APPARATUS

[75] Inventor: Ronald W. Blessin, Phoenix, Ariz.

[73] Assignee: Honeywell Information Systems Inc., Phoenix, Ariz.

[22] Filed: Oct. 1, 1973

[21] Appl. No.: 402,247

[52] U.S. Cl. .................... 235/153 AK; 340/146.1 R

[51] Int. Cl. ............................................ G06f 11/00

[58] Field of Search... 340/172.5, 146.1 R, 146.1 C, 340/146.1 AL, 146.1 D, 146.1 E, 146.1 AV, 146.1 AX; 235/153 R, 153 A, 153 AC, 153 AK; 178/69.5 R; 179/15 BF, 2 DP

[56] References Cited

UNITED STATES PATENTS

| | | | |
|---|---|---|---|
| 3,307,152 | 2/1967 | Robbins | 340/172.5 |
| 3,466,601 | 9/1969 | Tong | 340/146.1 D |
| 3,504,348 | 3/1970 | Hallman | 340/172.5 |
| 3,516,073 | 6/1970 | Goss et al. | 340/172.5 |
| 3,525,077 | 8/1970 | Jablonski | 340/172.5 |
| 3,550,082 | 12/1970 | Tong | 340/146.1 AL |
| 3,609,312 | 9/1971 | Higgins et al. | 235/153 AC |
| 3,668,645 | 6/1972 | Reymond et al. | 340/172.5 |
| 3,676,858 | 7/1972 | Finch et al. | 340/172.5 |
| 3,710,350 | 1/1973 | Yoshitake et al. | 340/172.5 |
| 3,790,769 | 2/1974 | Ziegler | 235/153 AK |

*Primary Examiner*—Gareth D. Shaw
*Assistant Examiner*—Mark Edward Nusbaum
*Attorney, Agent, or Firm*—Edward W. Hughes

[57] ABSTRACT

A data communications subchannel includes apparatus for separately testing the operation of the send control logic and the receive control logic. During testing operations the subchannel is configured in a wraparound mode so that data sent from a processor is routed through the send control logic and the receive control logic back to the processor. A "Cyclic Redundancy Check" is performed on the return data to determine if any errors are present. If errors are present in the return data the send control logic and the receive control logic can be selectively bypassed to aid in determining where the errors originate. Special control signals from the processor are used to configure the subchannel into the modes which perform the error testing.

4 Claims, 13 Drawing Figures

TO FIG. 5B

DATA COMMUNICATIONS SUBCHANNEL HAVING SELF-TESTING APPARATUS

BACKGROUND OF THE INVENTION

The present invention pertains to data processing equipment and more specifically to a data communication subchannel having means for checking the send logic and the receive logic separately to determine which of the portions of the subchannel may be introducing errors into data which passes through the subchannel.

Electronic data processing has rapidly become a necessary adjunct to the everyday business world and provides not only a means for calculating, accounting and general business processing but also provides a source of business management information. To incorporate a data processing system into a business frequently requires the transmission of data for entry into the system over long distances. Terminal devices convert the data from human readable form into binary form and transmit this data over the wires or microwave relay system from the terminal device to the data processor. Control modules such as a data communications subchannel and a communications controller are connected between the terminal device and the data processor.

The terminal device may transmit the binary data in a message code set which uses a first set of check characters to test the content of the message at the terminal device and use a second set of check characters to test the content of the message at the processor and compares the content of these check characters. Any difference in the content of the message can be noted and steps taken to correct errors which develop between the terminal device and the processor. One method used to correct errors is to retransmit the data until the errors disappear. If the errors persist extensive testing must be done to locate the portion of the data communication system which causes the errors. One of the portions of the data communications system which frequently introduces errors into the system is the data communication subchannel. The data communication subchannel includes a plurality of send logic, send control logic, receive logic and receive control logic. The send logic and the send control logic are used in sending data from the processor through the communications controller and the subchannel to the terminal device. The receive logic and the receive control logic are used in transmitting data from the terminal device through the subchannel to the communications controller and to the processor.

The prior art subchannels are tested by configuring the subchannel in a wraparound mode where data is sent from the processor through the communications controller, through the send logic, the send control logic, the receive logic and the receive control logic, through the communications controller and returned to the processor. Thus, the complete subchannel can be tested by comparing the data which is sent from the processor through the subchannel with the data received back from the subchannel. However, it is difficult to tell which portion of the subchannel may develop errors which are detected in the data being returned to the processor.

It is, therefore, an object of this invention to provide a new and improved apparatus for individually testing the various portions of the subchannel to determine where errors are being developed in the subchannel.

Another object of this invention is to provide a new and improved system for detecting the portion of a data communication subchannel which may cause errors to be developed in the subchannel.

Another object of this invention is to provide a new and improved apparatus for selectively testing the various portions of the subchannel.

A further object of this invention is to provide a new and improved apparatus for selectively bypassing the various portions of the subchannel while the subchannel is operating in a wraparound mode.

SUMMARY OF THE INVENTION

The foregoing objects are achieved in accordance with one embodiment of the present invention by employing apparatus which selectively bypasses signals around the send control logic and the receive control logic while the subchannel is operating in a wraparound mode. Data from the processor is sent through the send control logic and the receive control logic back to the processor where the data is checked against the original data. If errors exist in the return data the send control logic and the receive logic may be selectively bypassed to determine which portion of the subchannel is developing errors in the data which is sent around through the subchannel.

DESCRIPTION OF THE PREFERRED EMBODIMENT

Since the present invention pertains to data processing and to data communication techniques, the description thereof can become very complex. However, it is believed unnecessary to describe all of the details of the data communication system to completely describe the present invention. Therefore, most of the details that are relatively well known in the art will be omitted from this description. Even though details will be eliminated, a basic description will be given of the entire system to enable one skilled in the art to understand the environment in which the present invention is placed. Accordingly, reference is made to FIG. 1 showing a simplified block diagram of the data communication system of the present invention.

Figure 1:
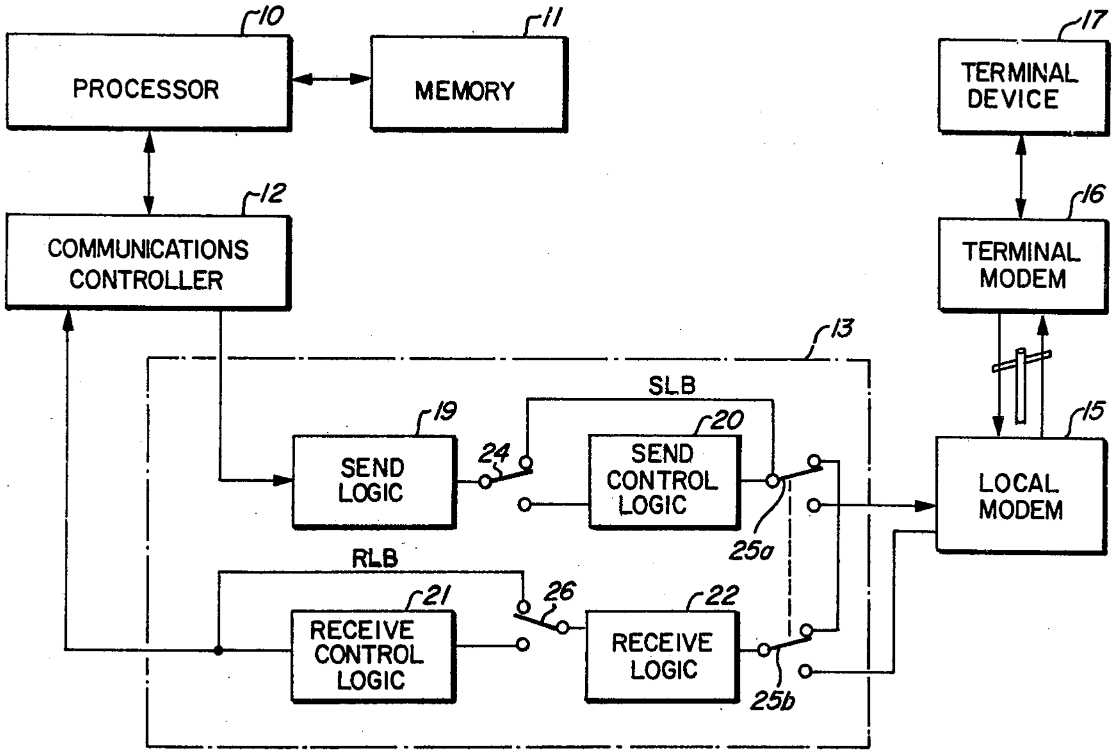
FIG. 1 is a simplified block diagram of a data communication system constructed in accordance with the teachings of the present invention.

The data communication system shown in FIG. 1 includes a data processor 10, a memory 11, a communications controller 12, a subchannel 13, a local modem 15, a terminal modem 16 and a terminal device 17. The data processor 10 in FIG. 1 manipulates data in accordance with instructions of the program. The processor receives an instruction, decodes the instruction and performs the operation indicated thereby. The operation is performed upon data received by the processor and temporarily stored thereby during the operation. The series of instructions is called a program and includes decodable operations to be performed by the processor. The instructions of the program are obtained sequentially by the processor and, together with the data to be operated upon, are stored in the memory. The memory 11 shown in FIG. 1 may form many of several well known types; however, most commonly the main memory is a random-access coincident-current type having discrete addressable locations each of which provides storage for a word. The word may form data or instructions and may contain specific fields useful in a variety of operations. Normally, when the processor is in need of data or instructions it will generate a memory cycle and provide an address to the memory. The data or words stored at the address location will subsequentially be retrieved and provided to the data processor 10.

A series of instructions comprising a program is usually "loaded" into the memory at the beginning of the operation and thus occupies a "block" of memory which normally must not be disturbed until the program has been completed. Data to be operated upon by the processor in accordance with instruction of the stored program is stored in the memory and is retrieved and replaced in accordance with the decoded instructions.

Communication with the data processing system usually takes place through the media of input/output devices including such apparatus as magnetic tape handlers, paper tape readers, punch card readers, and remote terminal devices. To control the receipt of information from the input/output devices and to coordinate the transfer of information to and from such devices, an input/output control means is required. Thus, a communications controller 12 may be connected between the processor and the subchannel which in turn is connected to the input/output devices such as a terminal device 17.

For a complete description of the processor of FIG. 1 and of the present invention which is embodied in such processor, reference is made to the U.S. Pat. No. 3,413,613 issued to David L. Bahrs et al. and assigned to the assignee of the present invention. The memory 11 may be of the type disclosed in the U.S. Pat. No. 3,521,240 by David L. Bahrs, John F. Couleur and Albert L. Beard, entitled "Synchronous Storage Control Apparatus for a Multi-Program Data Processing System," and assigned to the assignee of the present invention.

Before beginning the detailed description of the data communication system of the present invention, it is believed that a few words are appropriate concerning the manner in which this portion of the unit will be described. It is to be expressly understood that in the description which follows, most of the control circuits have been omitted for the purpose of brevity and clarity, but that these additional circuits would obviously be present in a complete system. However, inasmuch as the generation, use and interrelationship of a large number of these control signals does not, per se, form a part of the present invention, they are not included here. Additionally, it is to be understood that while many single lines are shown interconnecting the various components of the system, these lines in many cases represent a bus having multiple conductors. The number of conductors in any bus, will of course, vary in accordance with the dictates of the individual situation.

Binary information which may be supplied by the memory 11 of FIG. 1 to the subchannel is converted by the local modem 15 into modulated information which may be sent over telephone wires to the terminal modem 16. The terminal modem converts the modulated information into binary information for use by the terminal device 17. Binary information which is generated by the terminal device 17 is converted by the terminal modem 16 into modulated information which is sent over the telephone line to the local modem 15, which converts the information to binary information again for use by the subchannel 13. The local modem and the terminal modem may either receive modulated information and convert the modulated information into binary information or they may receive binary information and convert it into modulated information.

A more complete description of the operation of a data communication system is disclosed in U.S. Pat. No. 3,618,031 by James A. Kennedy, Aldis Klavins and Robert J. Koegel, entitled "Data Communications System."

GENERAL SYSTEM DESCRIPTION

It is believed that a general description of the operation of the data communication system shown in FIG. 1 will be beneficial at this point. A more detailed operation of the system will be included hereinafter. In this general description, reference will be made primarily to FIGS. 1 and 2. The subchannel 13 of FIG. 1 is a full duplex channel capable of shifting serial binary data bits in or out in a "binary synchronous communication" or BSC format using the Extended Binary Coded Decimal Information Code or EBCDIC character format which is widely used in the data communications industry. Some of the EBCDIC formats which may be used with the subchannel are shown as the transparent format A and the nontransparent format B of FIG. 2. The transparent format A includes four sync characters or SYN followed by a DLE, an STX, and by the data which is being transferred between the processor and the terminal device. The DLE or "data link escape" character warns that a special sync character such as an STX or "start of text," and ETX or "end of text" or other sync characters is to follow. The combination of binary bits which form a DLE could also be included in the data as shown between the other data of format A.

Each of the data bits is divided by a given polynomial to provide a "cyclic redundancy check" character or CRC which is used to check the accuracy of the data being transferred from the processor to the terminal device. The terminal device takes the same data which was used to accumulate the CRC's at the sending end, generates additional CRC's and then compares the CRC's developed in the terminal device with the CRC's developed at the sending device to determine if any errors have developed in the data being transferred from the processor to the terminal device. If errors are present in the data as indicated by the CRC's then corrective measures must be taken to remove the errors which develop during the transmission. The data characters are each 8 bits in length, while the CRC is 16 bits or the equivalent of two regular characters. It is necessary to send sync characters periodically to insure that the receiving equipment is still in synchronism with the data being received. If data should be sent for a relatively long period of time the synchronization may be lost, so a timer is provided in the sending equipment to automatically insert a DLE and an SYN between long groups of the data as shown in format A of FIG. 2. At the end of the data transmission a DLE and an ETX indicates that the transmission is to be terminated and 16 bits of CRC provide the cyclic redundancy check of the data which has been sent since the last CRC was transmitted from the sending device to the terminal device.

Figure 2:
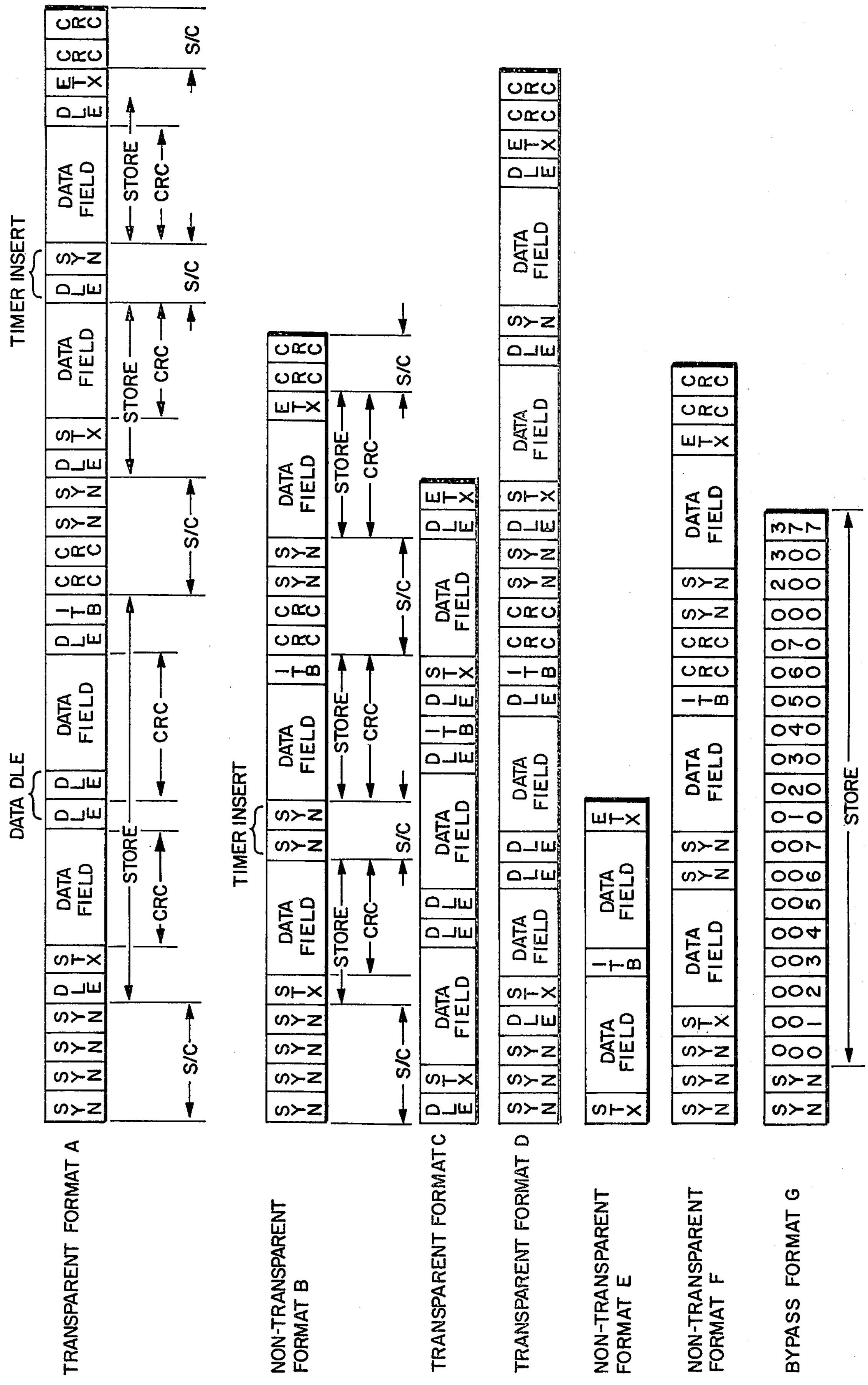
FIG. 2 shows various message formats which may be used in the data communication system.

The nontransparent format shown in FIG. 2 includes sync characters at the beginning of the transmission followed by an STX and by the data. The timer automatically inserts sync characters after a predetermined amount of time has elapsed as shown in the B format. Also the CRC is included to check for errors in the data being transmitted. The transmission is again ended by an ETX followed by the 16-bit CRC.

When the data communication system of FIG. 1 is configured in a send mode, the data from the processor is sent through the communications controller 12, the send logic 19, send control logic 20, the local modem 15, terminal modem 16 to the terminal device 17. When the data communication system is configured in the receive mode, data is sent from the terminal device 17 through terminal modem 16, local modem 15, receive logic 11, receive control logic 21 and communication controller 12 to the processor.

When it is desired to test the subchannel 13, the switches 25*a* and 25*b* are moved to the upper contact so that the subchannel is configured in a wraparound mode. It should be understood that switches 24, 25*a*, 25*b* and 26 may be logic gates or other switching devices. With the subchannel in the wraparound mode data from the processor is sent through communications contoller 12, send logic 19, send control logic 20, receive logic 22, receive control logic 21 and communications controller 12 back to the processor 10. If errors develop in the data which is sent through the subchannel in the wraparound mode it is necessary to isolate the section of the subchannel which produces these errors. One way of isolating the portions of the subchannel is to use the switches 24 and 26 to change the routing of the data when the subchannel is in the wraparound mode. For example, when switch 24 is connected to the upper contact, the data from the send logic bypasses the send control logic 20. If the data which returns to the processor is now free from errors this indicates that the send control logic has been at fault and developed the errors in the previous check. If, however, the errors are still present in the return data, switch 26 can be moved to the upper contact so that the data bypasses the receive control logic 21. If the errors are still present then the send logic 19 and the receive logic 22 may be checked. Since the send control logic 20 and receive control logic 21 comprise a considerable portion of the subchannel errors most commonly develop in these portions of the subchannel.

DETAILED DESCRIPTION OF THE PRESENT INVENTION

Figure 4A:
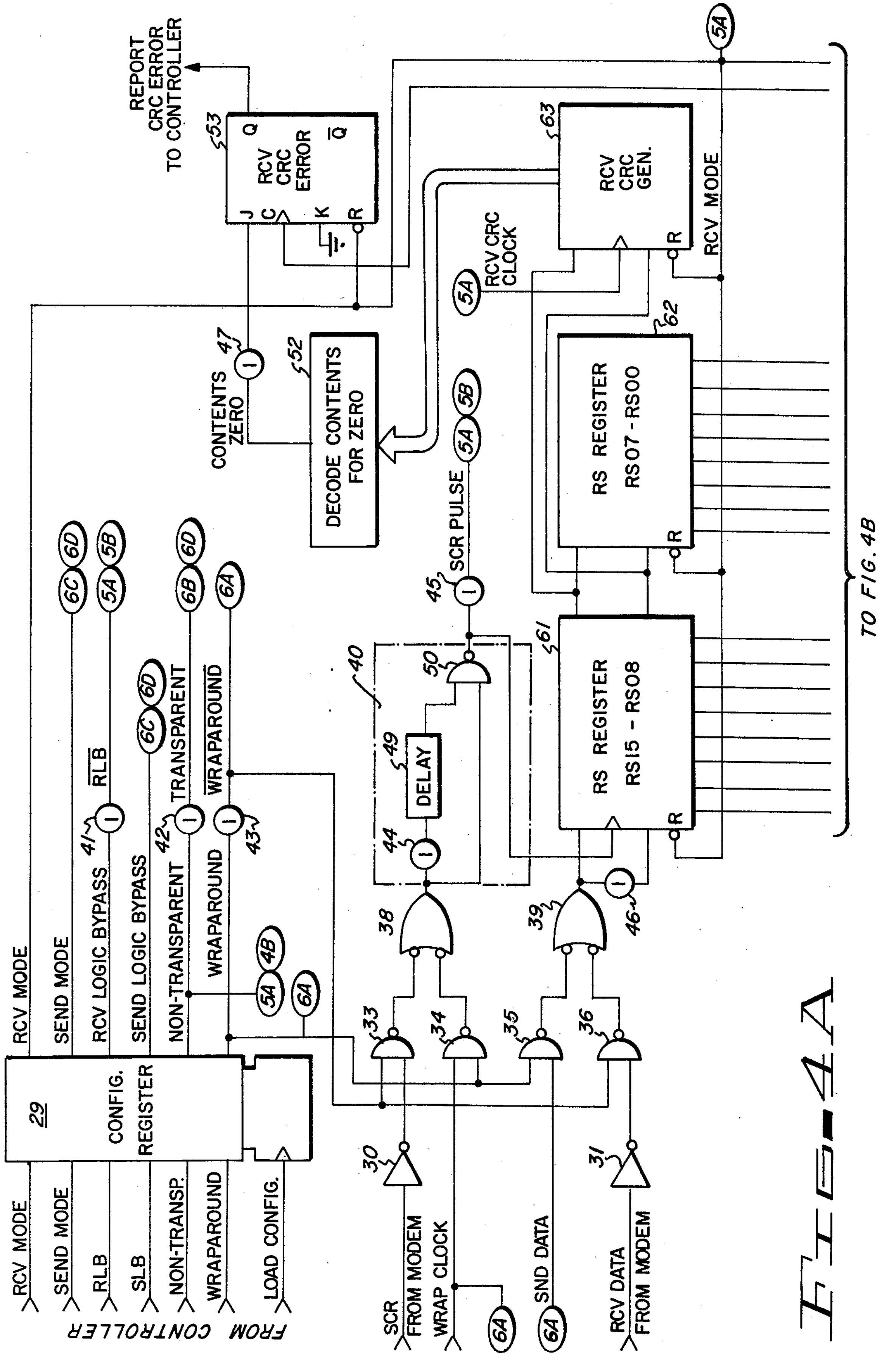
FIGS. 4A, 4B, 5A and 5B include a block diagram of the receive portion of a data communication subchannel of the present invention.

Signals from the controller are coupled to the configuration register 29 of FIG. 4A causing the register 29 to provide signals which determine the mode of operation of the subchannel. The signals which are available from the configuration register are a receive mode, send mode, receive logic bypass, send logic bypass, nontransparent mode, wraparound mode and their complements.

Figure 3:
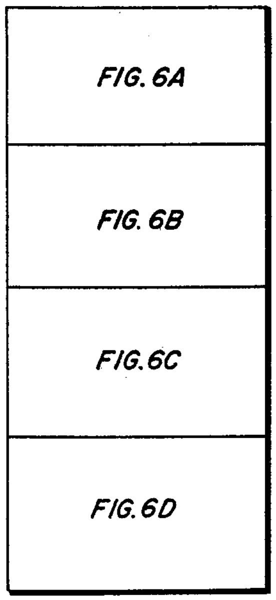
FIG. 3 illustrates how the portions of FIGS. 6A–6D are arranged.
Figure 4B:
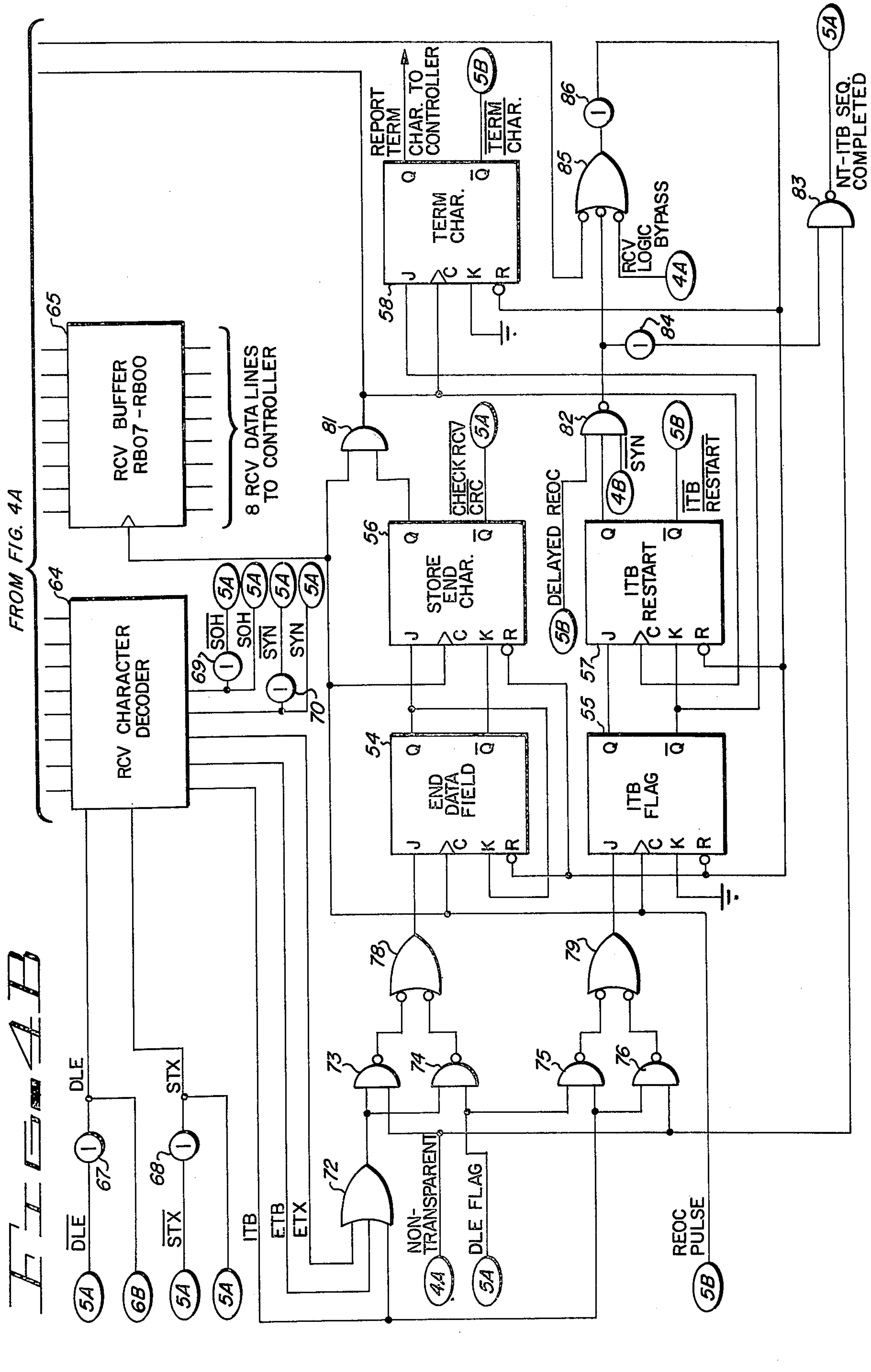
Figure 5A:
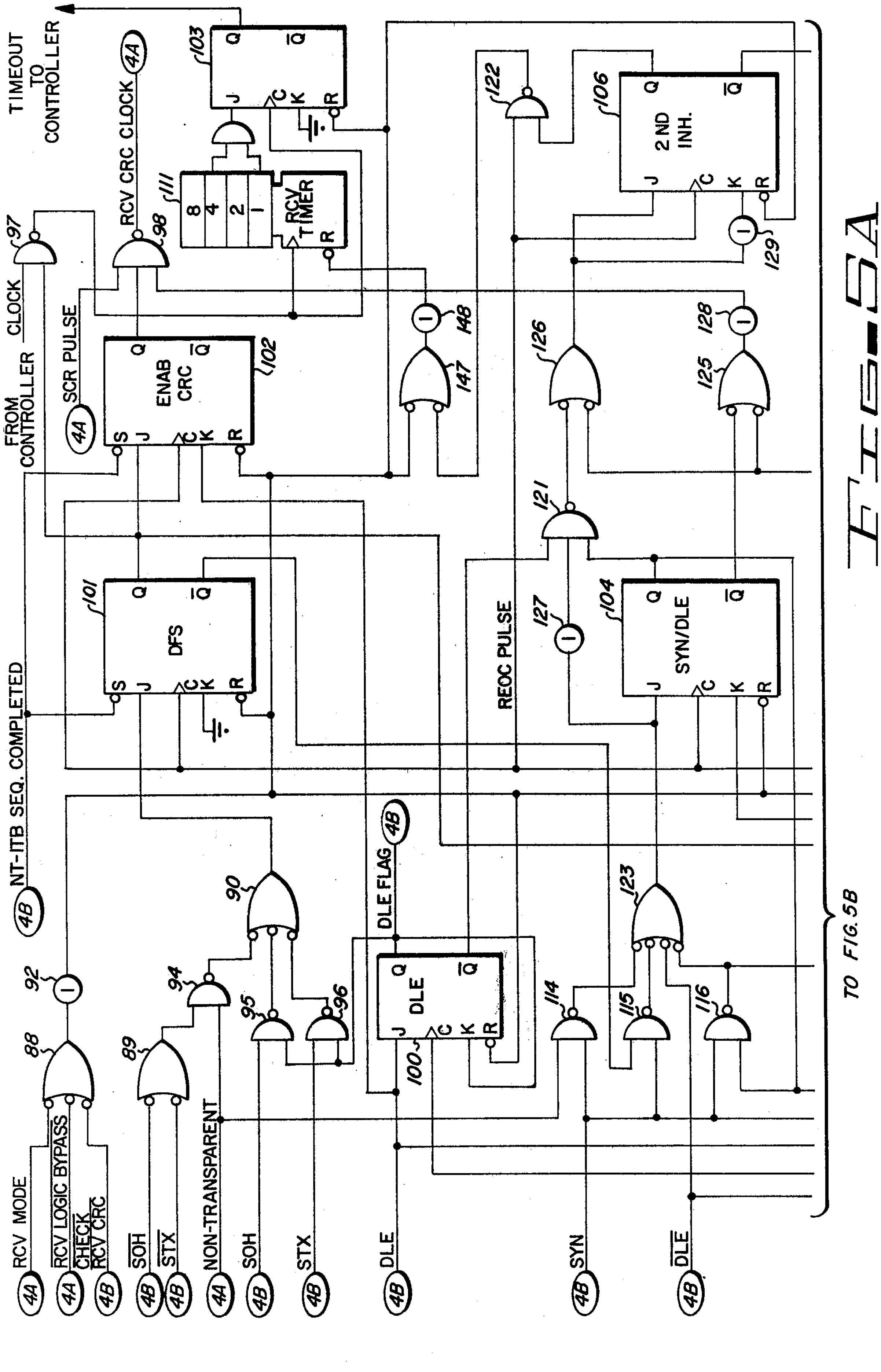
Figure 5B:
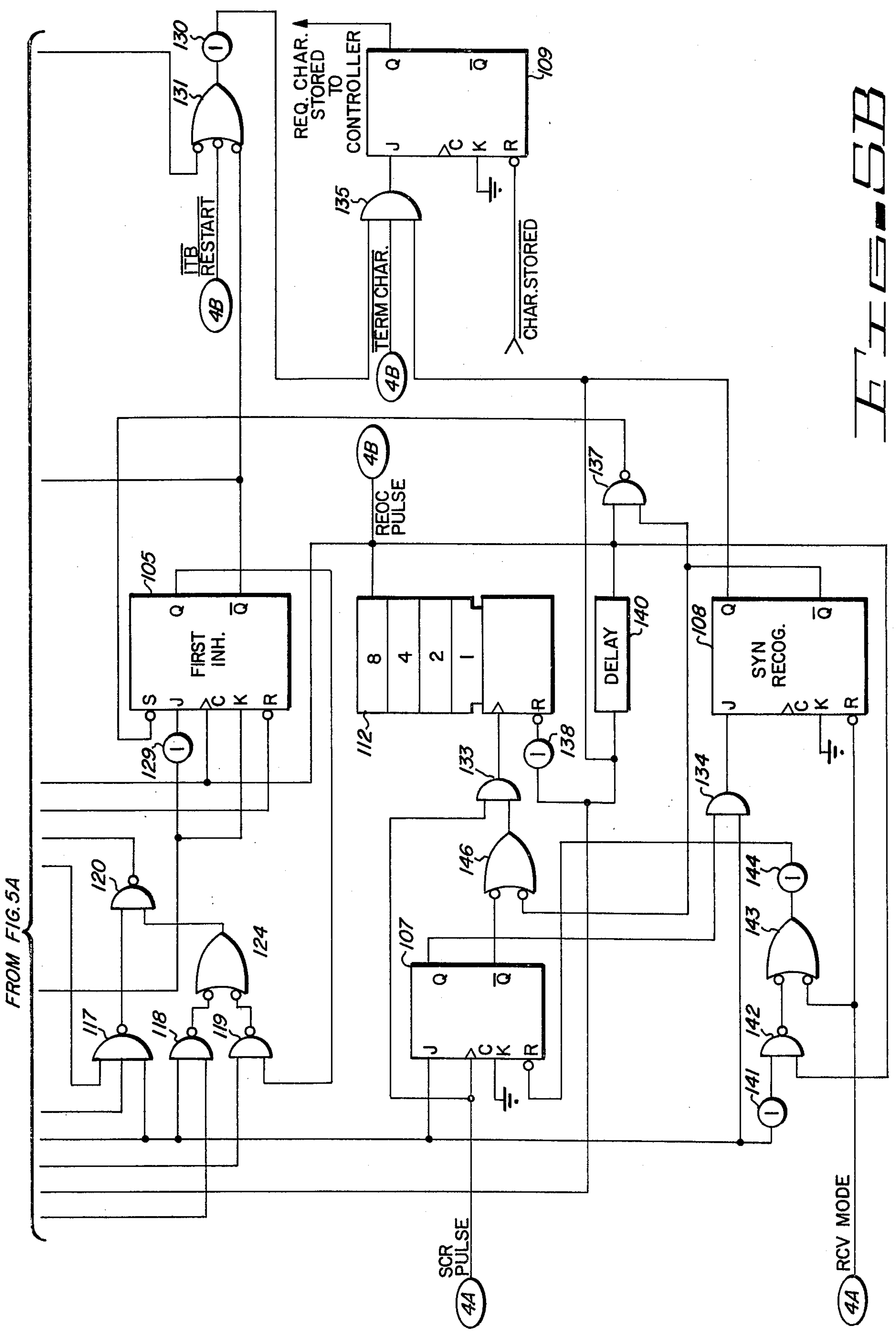

Details of the subchannel are shown in FIGS. 4A, 4B, 5A, 5B and 6A–6D FIGS. 4A, 4B, 5A and 5B show the receive portion of the subchannel, while FIGS. 6A–6D show the send portion of the subchannel. FIGS. 4A and 4B are drawn to be laid side by side with 4A above 4B so that leads from the bottom of FIG. 4A are connected to leads from the top of FIG. 4B. FIGS. 5*A* and 5B are also drawn to be placed side by side. FIGS. 6A–6D are drawn to be placed as shown in FIG. 3.

Connections between various FIGS. of the subchannel are indicated by the oval connectors having numbers contained therein. For example, the numbers inside the ovals connected to the "Send Mode" output lead of register 29 on FIG. 4A show that this output lead is connected to a portion of the subchannel on FIGS. 6C and 6D.

The NAND-gates disclosed in FIGS. 4A–6D provide a logical operation of conjunction and inversion for binary one signals applied thereto. In the system disclosed, the binary one is represented by a positive signal, the NAND-gand provides a low value of output signal representing a binary zero, when and only when all of the input signals applied thereto are positive and represent binary ones. The symbols identified by reference numeral 245 of FIG. 6C, represent a NAND-gate having two input leads. Such NAND-gates deliver a binary zero output signal only when each of the input signals applied thereto represents a binary one. When either of the input signals applied to the NAND-gate represent a binary zero, the output signal represents a binary one.

A flip-flop, as the term is used in the description of this portion of the present invention, is a bistable device whose output is a function of its last input signal. Such a flip-flop is shown and is represented by reference numeral 247 in FIG. 6C. This flip-flop is a 3-input, 2-output device having set and reset input leads and a pair of output leads. In this type of device, a binary zero applied to either of the two upper input leads places the flip-flop into its set state in which condition there is a binary one at its upper output lead and a binary zero at its lower output lead. Conversely, a binary zero applied to the lower input lead of flip-flop 247 places the flip-flop into a reset state in which there is a binary one at its lower output lead and a binary zero at its upper output lead.

Figure 6A:
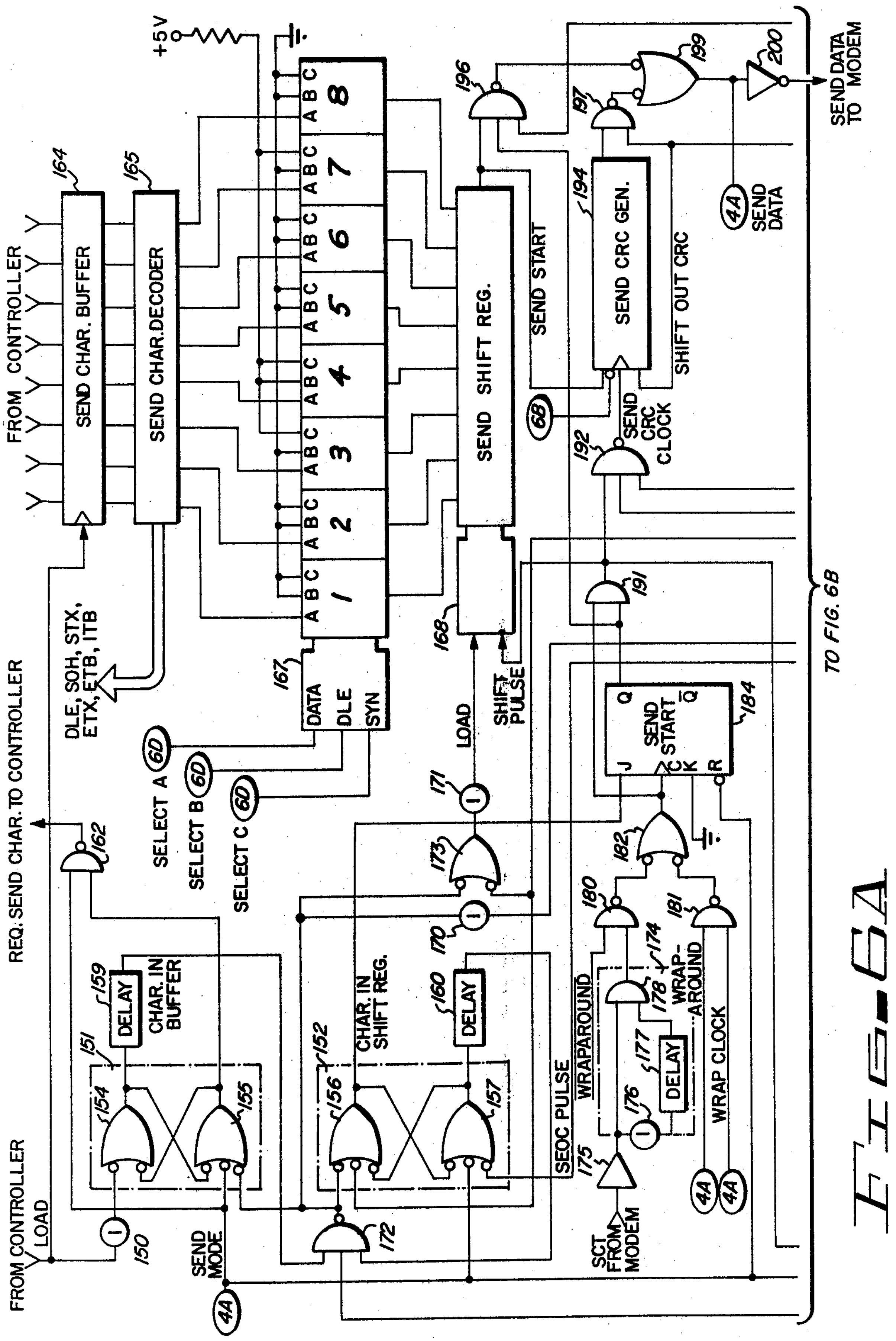
FIGS. 6A–6D illustrate a block diagram of the send portion of a data communication subchannel of the present invention.
Figure 6B:
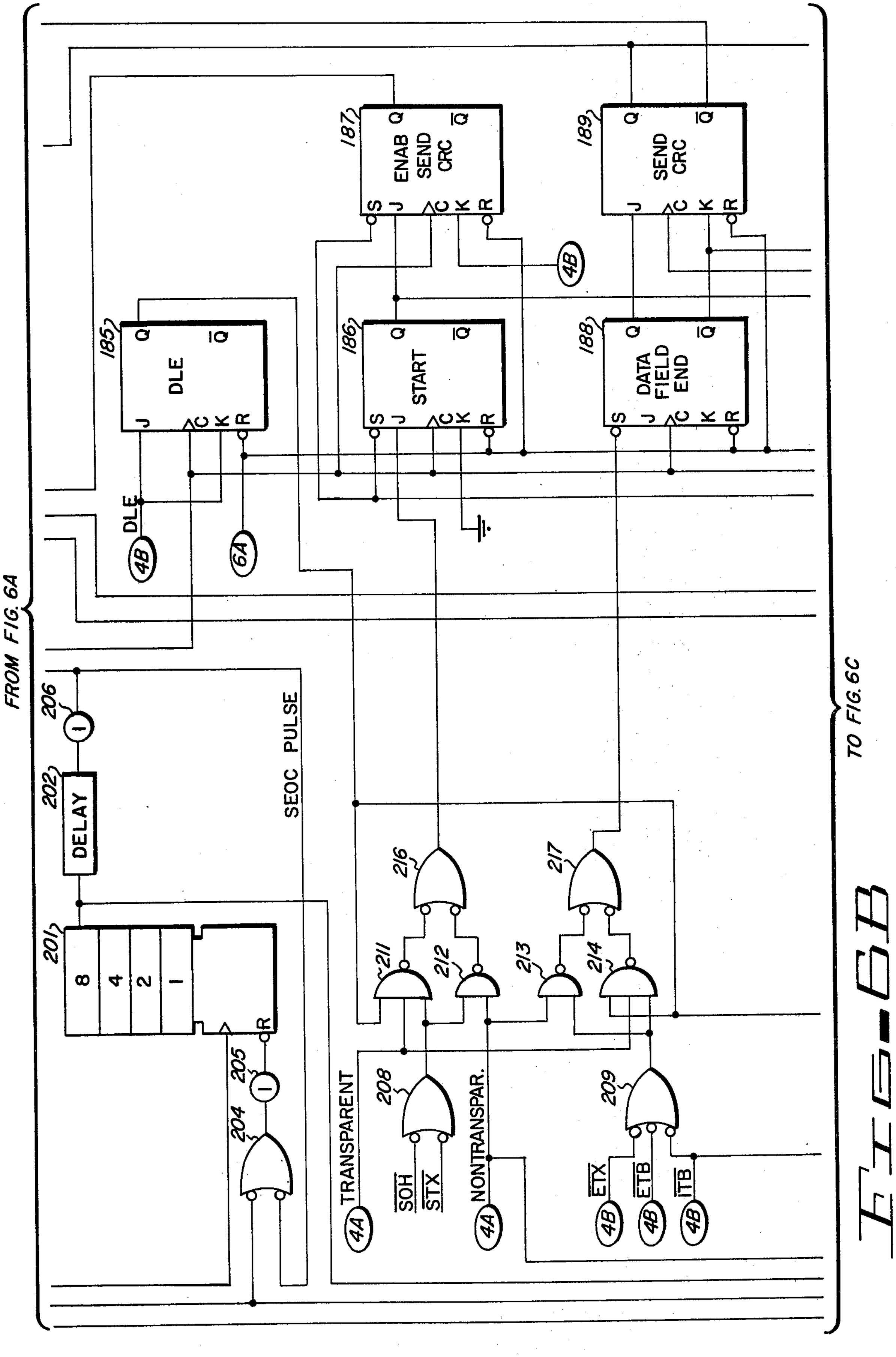
Figure 6C:
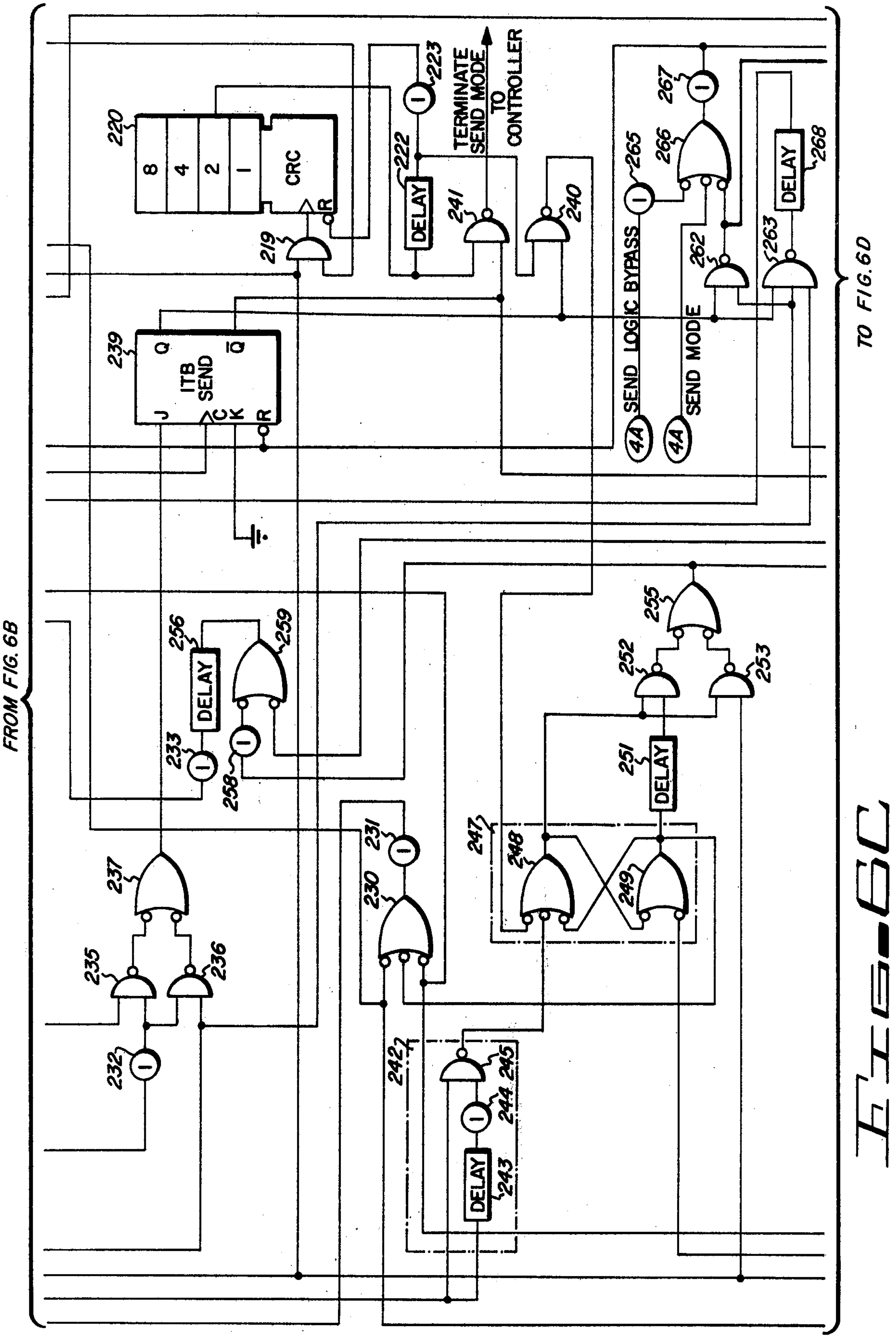

The delay lines shown in FIGS. 6C provide a predetermined amount of time delay for a signal applied to the input lead thereto. The symbol identified by the reference numeral 251 represents a delay line. A signal applied to the input lead of the left side of delay line 251 is delayed for a predetermined amount of time and it appears at the output lead at the right hand of delay line 251. Delay lines of the type used in the present invention are described in the textbook "Digital Computer Fundamentals," Second Edition, by Thomas C. Bartee, 1966, McGraw Hill, New York, N.Y.

The AND-gates disclosed in FIG. 6A provide a logical operation of conjunction for binary one signals applied thereto. In the system disclosed, the binary one is represented by a positive signal, the AND-gate provides a positive output signal representing a binary one, when and only when, all of the input signals applied thereto are positive and represent binary ones. The symbol identified by the reference numeral 191 in FIG. 6A, represents an AND-gate having two input terminals. Such an AND-gate delivers a binary one output only when each of the input signals applied thereto represents a binary one.

An inverter provides a logical operation of inversion when input signal applied thereto. The inverter provides a positive output signal representing a binary one when the input signal applied thereto has a value of zero volts representing a binary zero. Conversely, the inverter provides an output signal representing a binary zero when the input signal represents a binary one.

The JK flip-flops or binary multivibrator referred to in the specification and shown for example, in FIG. 6A of the drawings, are circuits adapted to operate in either of two stable states and to transfer from the state in which they are operating to the other stable state upon the application of a trigger signal applied thereto. In one state of operation the JK flip-flop represents the binary one (1-state) and in the other state the binary zero (0-state). The five leads entering the left-hand side of the flip-Flop symbol, for example, flip-flop 186, shown in FIG. 6B provides the required signals. The J lead, provides a set signal, the K lead provides a reset signal and the C lead provides a trigger signal. When the set input signal on the J lead is positive and the reset signal, on the K lead, is zero a positive trigger signal on the C lead causes a flip-flop to change the 1-state if it is not already in the 1-state. When the reset lead is positive and the set signal zero, a positive trigger signal causes the flip-flop to transfer to the zero state if it is not already in the zero state.

When the J and K input leads are both positive, or when the J and K leads are not connected to an external signal source, a positive signal pulse causes the flip-flop to change states. The S lead entering the top of the flip-flop and the R lead entering the bottom of the flip-flop also provides set and reset signals respectively. When a negative voltage potential is applied to the S lead the flip-flop sets to the 1-state and remains in the 1-state as long as the negattive voltage potential appears on the S lead irrespective of any signals on the J, C and K leads. When a negative voltage potential is applied to the R lead the flip-flop resets to the zero state and remains in the zero state as long as the negative voltage potential remains on the R lead irrespective of the J, C and K leads. Some flip-flops do not provide these S and R leads, for example, flip-flop 184 in FIG. 6A does not provide the S lead. The two leads leaving the right-hand side of the flip-flop deliver the output signals for each flip-flop. The upper output leads, the Q leads, deliver the 1-output signals of the flip-flops and the $\bar{Q}$ output leads, deliver the 0-output signals.

A shift register is a device which uses a plurality of storage devices such as flip-flops to store a plurality of bits of information. For example, the shift register 168 is shown in FIG. 6A may use eight JK flip-flops to store eight binary bits of data. In this register, the binary bits stored in each flip-flop will be shifted one place to the right each time a timing pulse is applied to the C lead on the flip-flops. A description of shift registers can be found in the textbook entitled "Digital Computer Fundamentals," by Thomas C. Bartee, second Edition, by McGraw-Hill, 1966, New York, N.Y.

The OR logic signals are developed by OR-gates which provide the logical operation of inclusive OR for positive signals applied thereto. The OR-gate provides an output signal representing a binary one, when any one or more of the input signals applied thereto represent binary ones. When none of the output signals represent binary ones, the output signal represents a binary zero. The symbol identified by reference number 72 of FIG. 4B represents an OR-gate having three input leads.

The NOR-gate provides the operation of an OR-gate and an inverter. The NOR-gate provides an output signal representing a binary one, when any one or more of the input signals applied thereto represent binary zeros. When none of the input signals represent a binary zero, the output signal represents a binary zero. The symbol identified by reference numeral 79 of FIG. 4B represents a NOR-gate having two input leads.

SEND MODE

If the configuration register is configured in a non-transparent, send mode, the configuration register 29 of FIG. 4A provides signals to the receive logic shown in FIGS. 6A–6D. The send signal is applied to the pulse shaping circuit 242 of FIG. 6C which provides a pulse to the flip-flop 247, thereby setting flip-flop 247 and providing a positive voltage to the upper input lead of NAND-gate 252. The positive voltage which had been at the output lead of NOR-gate 249 is delayed by line 251 so that the NAND-gate 251 is enabled thereby providing a pulse to the SYN counter 261 of FIG. 6D. This pulse causes a SYN counter 261 to enter a count of one and to provide a positive voltage at the 1-output lead.

Figure 6D:
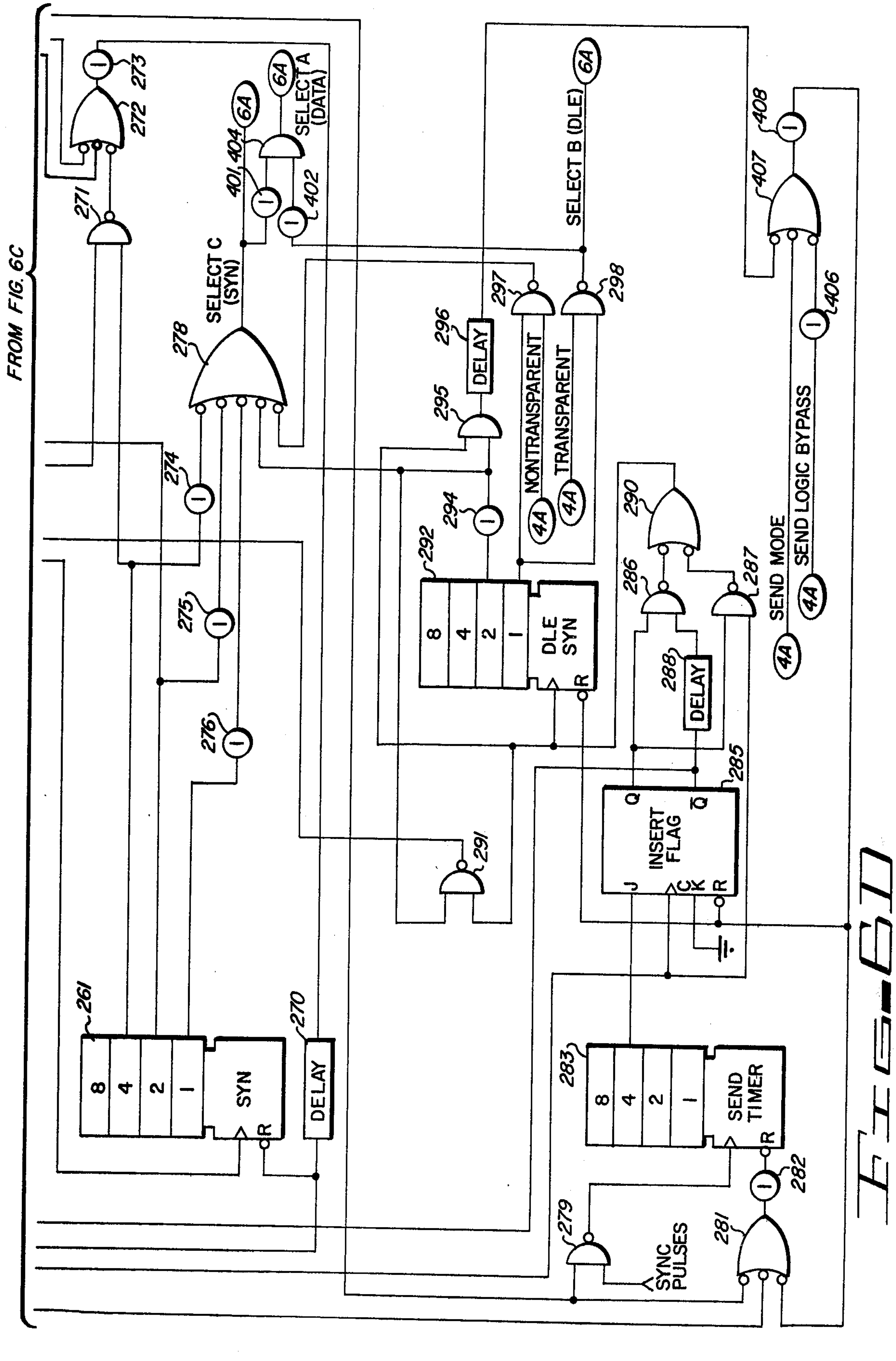

The voltage from the 1 output lead of counter 261 of FIG. 6D is inverted by inverter 276 and applied to an input lead of NOR-gate 278 causing the NOR-gate to provide a select C or SYN signal at the output lead. The select C signal from gate 278 is applied to the lower control lead of the input selector switch 167 of FIG. 6A. The select C signal causes a SYN signal to be loaded into the input select switch 167. A SYN signal is represented by a binary zero in the sections No. 1, 2, 5, 6 and 8 of the input select switch and a binary one in sections 3, 4 and 7 of the input select switch. In the present circuit a +5 volts represent a binary one and a ground signal represents a binary zero. The positive signal from the upper output lead of flip-flop 247 which is coupled through NAND-gate 252 and NOR-gate 255, inverter 258 and NOR-gate 259 is delayed by delay line 256 and coupled through inverter 233 of FIG. 6C to NOR-gate 173 and inverter 171 of FIG. 6A to the trigger input lead of the send shift register 168 thereby causing the SYN character in the input select switch 167 to be loaded into the 8-bit positions of the shift register 168.

The SCT pulses from the modem which are coupled through amplifier 175 and into the pulse generator 174 of FIG. 6A cause pulses to be developed at the C input lead of the send start flip-flop 184. The first pulse sets the flip-flip 184 causing the send start flip-flop 184 to provide a positive voltage to the Q output lead thereby enabling AND-gate 191. When AND-gate 191 is enabled each of the SCT pulses from the modem is coupled through gate 191 causing the bits of the shift register 168 to be shifted through NAND-gate 196, NOR-gate 199 and amplifier 200 thereby providing the SYN character to the local modem 15 of FIG. 1. This SYN character is transmitted over the telephone lines to the terminal modem 16 and to the terminal device 17 of FIG. 1.

While a first SYN character is being shifted from the send shift register 168 of FIG. 6A through the amplifier 200 to the modem, the "character in buffer" flip-flop 151 is reset and there is not character in the send character buffer 164. The flip-flop 151 provides a positive voltage on the lower output lead which sends a request-send-character signal to the controller. The controller responds by placing an STX character on the input leads to the send character buffer 164 of FIG. 6A and provides a "load pulse" which loads the character into this buffer. The load pulse also sets flip-flop 151 so that it provides a positive output signal to the NAND-gate 172. Gate 172 is disabled by a signal from the lower output lead of flip-flop 247 of FIG. 6C while the SYN characters are being loaded from the input select switch 167 into register 168. Flip-flop 184 provides a positive voltage which enables gate 191 so that the SCT pulses from the modem are coupled through gate 191. Each SCT pulse causes the contents of the send shift register 168 of FIG. 6A to be shifted one position to the right, causes another bit to be shifted to the modem, and increments the counter 201 of FIG. 6B until it reaches a count of 8. The count of 8 from counter 201 is delayed by delay line 202 inverted and resets the counter 201 to a count of zero. This count of eight also provides a send end-of-character pulse, or SEOC which resets flip-flop 152 of FIG. 6A and increments the SYN counter 261 of FIG. 6D to a count of 2. The SEOC pulse is coupled through gates 253, 255 and 259 of FIG. 6C, delayed by delay line 256 and provides a parallel load pulse which causes the second SYN character to be loaded into the shift register 168.

Again this SYN character is shifted from the shift register 168 through gates 196, 199 and amplifier 200 to the modem. The SEOC then causes the third SYN character to be loaded into the shift register and then later the fourth SYN character is loaded into the register and shifted to the modem. After the final SYN character is shifted out of the send shift register 168 the next SEOC resets the character-in-shift-register flip-flop 152. At this time the SYN counter 261 reaches a count of four causing NOR-gate 278 to be disabled so that the select C signal to the input lead of the input select switch 162 decreases and SYN characters are no longer loaded into the input select switch 167. The low value of signal from gate 278 is inverted by inverter 401 thereby enabling the AND-gate 404 of FIG. 6D and providing a select A signal from gate 404. Gate 271 is disabled so that a signal from gate 271 through gate 273, inverter 273 and delay line 270 resets flip-flop 261 and resets counter 261 to a count of zero. The select A signal from gate 404 enables the select A or data input lead of the input select switch 167 of FIG. 6A. When the data input lead of switch 167 is enabled characters from the controller are loaded from the buffer 168 and decoder 165 into the input select switch 167. Because the first character supplied from the controller is an STX it is decoded by the send character decoder 165 and is available as a signal on the output cable at the left end of the decoder 165. The STX signal is coupled through gates 208, 211 and 216 to flip-flop 186 of FIG. 6B so that flip-flop 186 is set when the next pulse from gate 172 of FIG. 6A sets flip-flop 152. Since flip-flop 151 is reset at this time the subchannel requests another character from the controller. The controller again gates the next character into the character buffer 164 with a load pulse which also sets flip-flop 151. With flip-flop 186 set the gate 279 of FIG. 6D is enabled so that the SYN pulses are gated to the C input lead of the send timer 283.

The next SEOC pulse causes the flip-flop 187 of FIG. 6B to be set. When flip-flop 187 is set the gate 192 of FIG. 6A is enabled so that the send CRC generator divides all outgoing data by a polynominal. The subchannel continues to shift out and request additional characters until the send timer 283 of FIG. 6D reaches a count of 4 indicating one second has elapsed since the STX character was sent. The next SEOC pulse sets the inert flag flip-flop 285 which disables the send CRC clock. When the insert flag flip-flop 285 sets, gate 172 is disabled and the DLE SYN counter 292 is incremented to a count of 1. The count of 1 from the counter 292 and the nontransparent mode signal enables gate 297 causing the NOR-gate 278 to provide a select C or SYN signal to the input select switch 167 of FIG. 6A again. The SYN character is shifted from the shift register 168 and the next SEOC pulse increments the DLE SYN counter to a count of 2. Again, another SYN character is loaded into the shift register 168, the next SEOC pulse enables AND-gate 295, the signal is delayed and resets the send timer 283, the insert flag flip-flop 285 and the DLE SYN counter 292. NAND-gate 172 is again enabled allowing the characters in the send character buffer 164 to be loaded into the send shift register 168 when flip-flop 152 sets. Since the insert flag flip-flop 285 is reset, the send CRC clock signal is coupled to the send CRC generator causing generator 194 to be enabled.

The subchannel continues to send data characters and to accumulate a CRC until the ITB character is loaded into the send character decoder 165 and is decoded. As the ITB character is loaded into the 8-bit shift register 168 the "data field end" signal from flip-flop 188 and the ITB send signal from flip-flop 239 are both positive. On the next SEOC pulse the data field end signal and the SEOC pulse cause the send CRC flip-flop 189 to set. The flip-flop 189 provides a signal which causes the CRC generator 194 to bypass its internal Exclusive-OR circuits and become a straight shift register. The next SEOC pulse is developed after 8 bits of the CRC have been shifted through gates 197 and 199 to amplifier 200 and to the modem. This same SEOC pulse also increments the CRC counter 220 to a count of 1. The following SEOC causes the CRC counter 220 of FIG. 6C to go to a count of 2 and since the ITB send flip-flop 239 is set signals from counter 220 and flip-flop 239 enable gate 240 causing flip-flop 247 to set. Flip-flop 247 provides a signal which causes sync counter 261 to be incremented to a count of 1 which turns on the select C signal at gate 278 of FIG. 6D. As a result a sync character is loaded into the send shift register 168.

The next SEOC increments the SYN counter 261 to a count of 2. Counter 261 provides a signal through gates 262 and 272, inverter 273 and delay line 270 which resets flip-flop 247 and SYN counter 261. The signal through gates 262, and 266 and inverter 267 resets the ITB send flip-flop 239, the data field end flip-flop 188, the send CRC flip-flop 189, the start flip-flop 186 and the enable send CRC flip-flop 187. Because of the delay line 268 between the output lead of gate 263 and the S input leads of flip-flops 186 and 187 the flip-flops are both set thereby causing the accumulation of a new CRC on all data which follows the two SYN characters. The data field is terminated with an ETX. As the ETX is loaded into the 8-bit shift register 168 and data field end flip-flop 188 is set. The next SEOC sets the send CRC flip-flop 189 and the contents of the CRC generator 194 are ready to be shifted out. The second SEOC indicates that the entire CRC has been shifted out and the CRC counter 220 provides a pulse to the control logic to terminate the send mode.

CRC GENERATOR

Figure 7A:
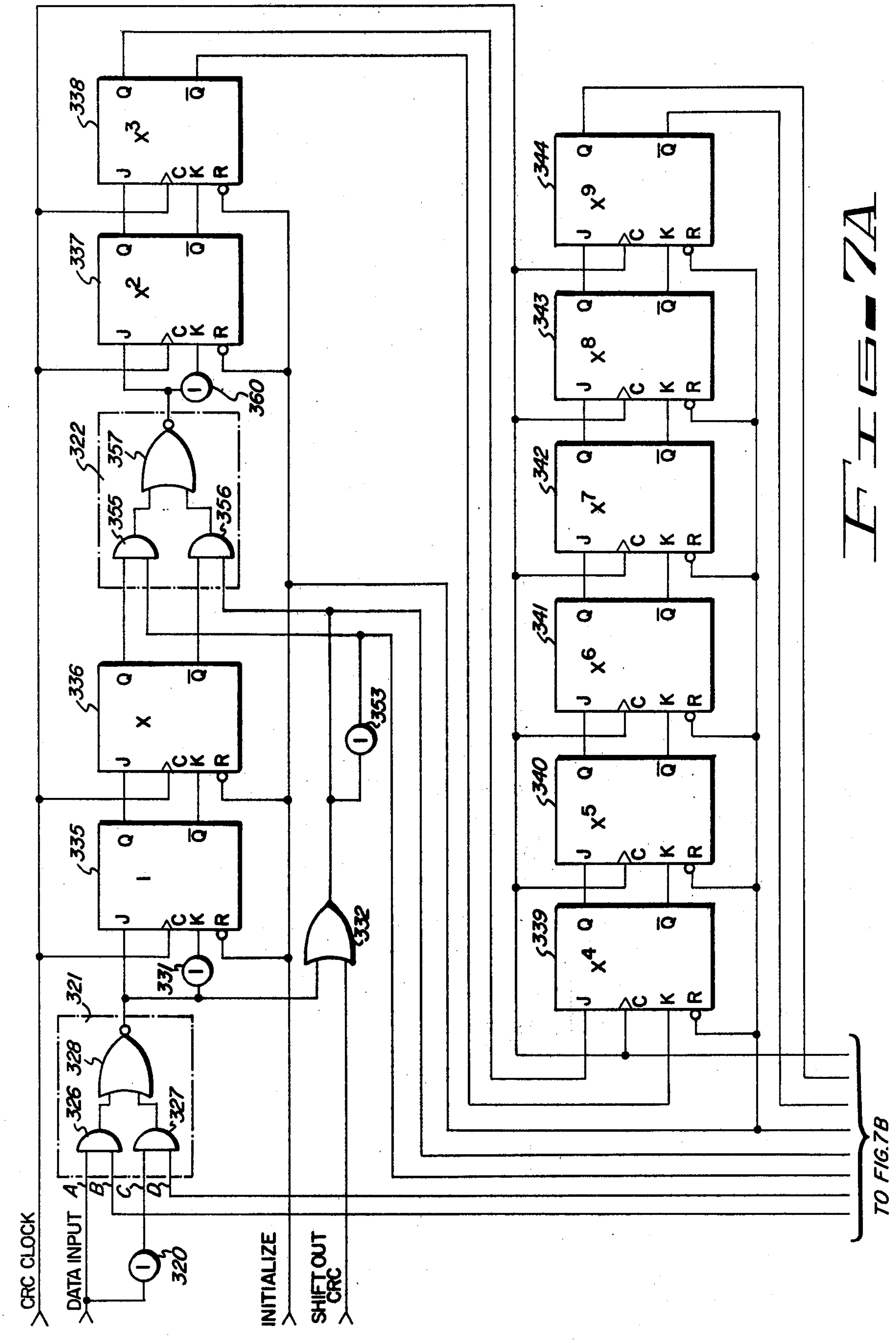
FIGS. 7A and 7B illustrate one embodiment of a CRC generator.
Figure 7B:
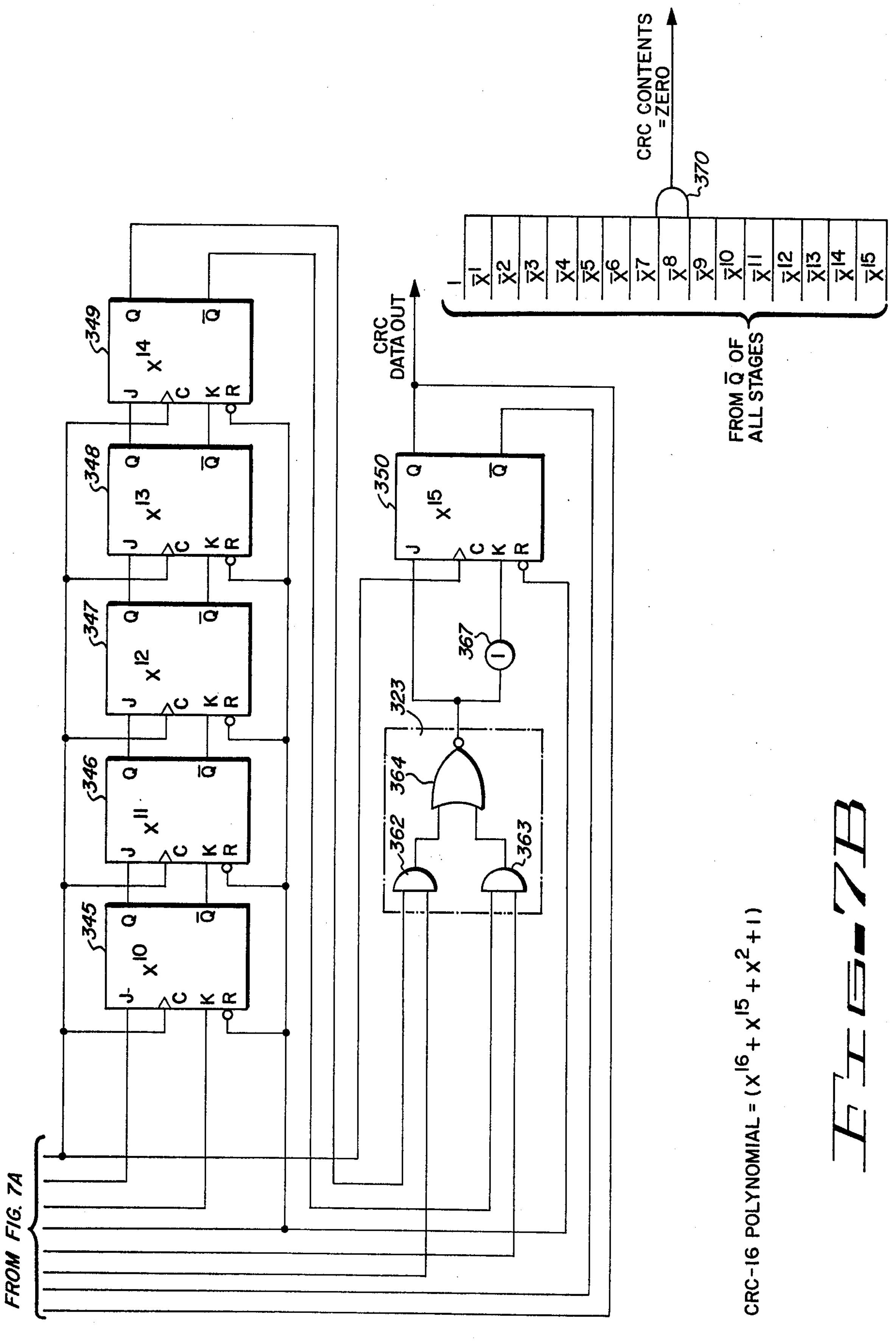

The operation of 16-bit receives the CRC generator 63 of FIG. 4A and the 16-bit send CRC generator 194 of FIG. 6A can be more clearly seen by referring to the detailed drawing of a CRC generator in FIGS. 7A and 7B. A typical CRC generator of the type shown in FIGS. 7A and 7B includes a plurality of Exclusive-OR gates 321–323, a plurality of JK flip-flops 335–350, a plurality of inverters such as inverter 320 and a NAND-gate 332. Each of the reset leads of the JK flip-flops may be connected to each of the C input leads of the JK flip-flops and the data input is applied to the leads of Exclusive-OR gate 321. A shift out CRC lead may also be connected to the CRC generator. The decoder 52 of FIG. 3A is also shown on FIG. 7B and includes an AND-gate 370 with the input leads connected to the $\bar{Q}$ output leads of each of the JK flip-flops shown in FIGS. 7A and 7B.

When it is desired that the circuit of FIGS. 7A and 7B be used as a CRC generator, data is applied to the data input lead and coupled to the Exclusive-OR gate 321. A low value of signal representing a binary zero is applied to the shift out CRC input lead of the CRC generator. When it is desired that the circuit of FIGS. 7A and 7B be used as a straight shift register a positive voltage representing a binary one is applied to the shift out CRC input lead. Thus, the circuit of FIGS. 7A and 7B can be used as a CRC generator or can be used as an ordinary shift register.

When the circuit of FIGS. 7A and 7B is used as a CRC generator the circuit is first initialized or reset by a voltage on the initialize input lead causing binary zeros to be loaded into each of the flip-flops 335–350. The data to be checked is divided by the polynomial shown in FIG. 7B to provide an output signal which can be used to check large quantities of data for errors which may be introduced in the data communications system. When the first data bit is applied to the data input lead, this data in the form of a binary one or a binary zero and is exclusive-ORed with the output of the flip-flop 350. Since the circuit has been initialized the flip-flop 350 is in a reset state so that a binary one is coupled to the D input lead of Exclusive-OR gate 321 and a binary zero is coupled to the B input lead of the Exclusive-OR gate 321. For example, when the first binary bit applied to the Exclusive-OR gate 321 is a binary one this binary one is applied to the A input lead of Exclusive-OR gate 321 and a binary zero is applied to the B input lead of Exclusive-OR gate 321. These signals cause the AND-gate 326 to provide a binary zero to the upper input lead of OR-gate 328. At the same time a binary one from the $\bar{Q}$ output lead of flip-flop 350 is applied to the D input lead of AND-gate 327 and a binary zero is applied to the C input lead of AND-gate 327 thereby causing gate 327 to provide a binary zero to the lower input lead of OR-gate 328. The two input signals to the leads of NOR-gate 328 cause gate 328 to provide a binary one to the J input lead of flip-flop 335 so that a binary one is stored in flip-flop 335 when the next CRC clock pulse is applied to the C input lead.

The binary one from gate 321 and the binary zero from flip-flop 336 applied to Exclusive-OR gate 322 cause a binary one to be loaded into flip-flop 337. The binary one from gate 321 and a binary zero from flip-flop 349 cause a binary one to be loaded into the output flip-flop 350. If the second binary bit is also a binary one, a zero will be loaded into flip-flops 335, 337 and 350 on the next CRC clock pulse, the binary one from flip-flop 335 will be shifted to flip-flop 336, the binary one from flip-flop 337 will be shifted to the flip-flop 338. It can be seen that each of the binary data bits applied to the data input lead of the CRC generator is "exclusively-ORed" with binary bits which have been previously stored in the CRC generator, causing a binary bit to be loaded into the flip-flops 335, 337 and 350.

When the circuit of FIGS. 7A and 7B is used as an ordinary shift register a voltage applied to the shift output CRC lead is coupled to OR-gate 332 to enable the AND-gates 355 and 356 of Exclusive-OR circuit 322 and AND-gate 363 of the Exclusive-OR gate 323. Thus the signals in the flip-flops of the CRC generator are shifted to the right one position each time that a CRC clock is applied to the C input leads of the flip-flops. The Exclusive-OR gates 321–323 disclosed in FIG. 6 provide a positive output signal representing a binary one when either the data input represents a binary one or when the flip-flop connected to the input leads of the Exclusive-OR gate represents a binary one. For example, when the data input is a binary one and the output flip-flop 350 is in the binary one state the exclusive OR 321 provides a binary zero at its output lead. When the data input signal is a binary one and the flip-flop 350 is in the zero state the Exclusive-OR gate 321 provides a binary one at its output lead. Also when the data input signal represents a binary zero and the flip-flop 350 is in the binary one state the Exclusive-OR also provides a binary one on its output lead. A CRC generator of the type which can be used with the present invention is described more completely in the textbook "Error Correction Codes" second Edition, by Peterson and Weldon, MIT Press, 1972.

RECEIVE MODE

When the configuration register 29 of FIG. 4A is configured in the receive mode and the nontransparent mode, serial data bits shown in FIG. 2, format B are shifted into the 16-bit RS register comprising register 61 and 62, by the negative going edge of the SCR pulse from the modem. The data from the modem is coupled through amplifier 31, gates 36 and 39 to the input leads of the RS register 61. The SCR pulses from the modem are coupled through amplifier 30, gates 33, 38 and pulse shaping circuit 40 to the trigger input lead of the register 61. When register 61 is filled the additional bits of the character are shifted into the register 62. The receive character decoder 64 has seven decoded outputs to provide the binary representations of the various control characters to other portions of the subchannel.

In order to have the subchannel synchronized with the characters being received at least two consecutive SYN characters are provided to the subchannel. The first SYN character is applied to the J input lead of the "one SYN" flip-flop 107 of FIG. 5B which sets the flip-flop 107. When the flip-flop 107 is set, an enabling pulse is coupled through gate 146 to the lower lead of AND-gate 133 thereby enabling gate 133 so that the next SCR pulse causes the character counter 112 to increment a count of 1. After seven more SCR pulses the character counter 112 creates a count of 8 which produces a receive end of character or REOC pulse. If another SYN character is not presently stored in the RS register 61, the one SYN flip-flop 107 is reset by a pulse coupled through gates 142, 143 and inverter 144.

If, however, another SYN character is in the register 61 when the first REOC occurs, the SYN character is decoded by decoder 64 and provides a signal which causes the SYN recognition flip-flop 108, the first inhibit flip-flop 105 and the SYN/DLE flag flip-flop 104 to be set. The first SYN character has now been shifted from the RS register 61 of FIG. 4A to the register 62 and the REOC signal causes the SYN character to be loaded into the RCV buffer 65 of FIG. 4B. Since the "REQ" character store flip-flop 109 of FIG. 5B is reset the controller logic does not provide a request to store the sync character. When the third SYN character is shifted into register 61 the signal from the RCV character decoder 64 causes the SYN/DLE flip-flopp to remain set and causes the flip-flop 105 to remain set. The voltage from the $\overline{Q}$ output lead of flip-flop 105 causes flip-flop 106 to set. Whenever flip-flop 105 or flip-flop 106 is set, flip-flop 109 is inhibited from setting because the output signal from the AND-gate 135 is low. The conditions remain the same when the fourth SYN character is shifted into register 61.

The next character, an STX, is shifted into the register 61 and decoded by the RCV decoder 64. The decoded STX signal is coupled through NOR-gates 89, 94 and 90 causing the DFS flip-flop 101 to set. Flip-flop 101 provides a signal through gates 117 and 120 of FIG. 5B causing flip-flop 104 and 105 to reset. When the first data character which follows the STX is shifted into register 61 the STX has been shifted into register 62 and is loaded into the RCV buffer 65. The REOC clock pulse causes the second input flag flip-flop 106 to be reset. When flip-flop 106 is reset the signal from the $\overline{Q}$ output lead is coupled through gate 131, inverter 130 and gate 135 causing the request character store flip-flop 109 of FIG. 5B to be set. Flip-flop 109 provides a positive voltage at the Q output lead which requests the controller to store the STX character. At this time the enable CRC flip-flop 102 is set thereby enabling the gate 98 so that the next CRC pulses cause gate 98 to provide an RCV CRC clock pulse which causes the receive CRC generator 63 of FIG. 4A to be enabled. After 1 second of transmission, the remote terminal will insert two sync characters into the data stream to insure synchronization. These characters will not be stored and will not be used in the calculation of the CRC.

When the first sync character is decoded by the RCV character decoder 64 the decoded signal causes the SYN/DLE flipflop 104 of FIG. 5A to be set. When flip-flop 104 is set the signal from the Q output lead of flip-flop 104 is coupled through gate 125, inverter 128 and inhibits gate 98 so that the receive CRC clock pulse cannot be generated, thereby disabling the receive CRC generator. When the second sync pulse is shifted into the receive character decoder 64 the output voltage causes the flip-flop 104 to be reset and causes flip-flop 105 to be set by the signal through gate 116. However, the signal from the Q output lead of flip-flop 104 continues to inhibit the CRC clock thereby preventing the receive CRC generator from operating. When the next data character following the second sync character is shifted into the receive register 61 flip-flop 105 resets thereby enabling the gate 98 so that the receive clock signal is applied to the receive CRC generator. The second inhibit flip-flop 106 remains set thereby inhibiting gate 135 while the second sync character is shifted into register 62 of FIG. 4A and into the receive buffer 65 of FIG. 4B. By inhibiting the setting of the request character store flip-flop 109 the storage of the two sync characters is prevented. At the same time the signal from the Q output lead of flip-flop 106 is coupled through gates 122, 147 and inverter 148 to reset the receive timer 111. Timer 111 counts a period of 3 seconds after flip-flop 101 is set. If one or two sync characters have not been received within this 3 second period the timer 111 provides a signal which causes the time out flip-flop 103 to set, thereby providing a time out signal to the controller. If only one sync character is inserted flip-flop 104 sets thereby inhibiting the clock gate 98 and the next REOC receive pulse flip-flop 104 resets, but flip-flop 106 is set by signal coupled through gates 121 and 126, thereby inhibiting the request character restore flip-flop 109 from setting.

The subchannel resumes storing characters and accumulating them into receive CRC generator 63 using all data following the sync character up to and including the ITB character. When the receive character decoder 64 decodes the ITB character, the end data field flip-flop 54 of FIG. 4B and the ITB flag flip-flop 55 are both set. The next REOC signal causes the store end character flip-flop 56 to set and causes the ITB character to be moved into the receive buffer 65. When flip-flop 56 sets the signal from the Q output lead is coupled through gates 88, inverter 92, of FIG. 5A causing flip-flops 100, 101, 102, 103, 104, 105, and 106 to be reset. The next REOC pulse causes a check pulse to be generated at gate 81 and coupled to the C input lead of flip-flop 53. When there are no CRC errors the content of decoder 52 of FIG. 4A will be zero. If the contents of decoder 52 is not near zero an error has been detected by the CRC generator 63. If the contents of the RCV generator is zero the decoder 52 provides a positive voltage which is inverted and applied to the J input lead of the receive CRC error flip-flop 53. This causes the flip-flop 53 to remain reset. If the contents of the RCV generator 63 is not zero as decoded by decoder 52 the signal from decoder 52 causes the receive CRC error flip-flop 53 to set. The check pulse also sets the ITB reset flip-flop 57 which inhibits the J input of the request character store flip-flop 109 and prevents either the CRC character or the two following sync characters from being stored.

Following the CRC are two sync characters which are shifted in to the registers 61 and 62 but again are not stored. When a non-sync or data character is applied to the lower input lead of the gate 82 flip-flops 54, 55, 56, and 57 are all reset. Flip-flops 101 and 102 of FIG. 5A are both set by signals coupled through gate 83 of FIG. 4B. Thus, the subchannel stores all the characters after the second character and uses them to accumulate a new CRC character. This continues until the ETX is decoded. When an ETX is loaded into decoder 64 the decoder provides a signal which sets flip-flop 54. The next REOC pulse causes flip-flop 56 to set and the ETX to be stored. The following REOC pulse causes a check pulse to generate and again set flip-flop 53, if the contents of the receive CRC generator is not zero. Also the term character flip-flop 58 sets causing the status of the terminate character to be reported to the controller. When flip-flop 58 sets gate 135 is disabled so that the ETX is the last character to be stored.

In the transparent receive mode the data format A of FIG. 2 is used to synchronize the subchannel in the same manner as discussed above. Following the SYN characters is a DLE character which is the first of the characters to be stored. The DLE character from the controller is sent through the send character buffer 164 of FIG. 6A and decoded by the send character decoder 165. The DLE signal which is decoded by the decoder 165 causes the DLE flip-flop 185 of FIG. 6B to be set. The next character which is an STX is decoded by decoder 165 and coupled through gates 94 and 90 causing flip-flop 101 of FIG. 5A to set. At the end of the next character the enable CRC flip-flop 102 is set and the subchannel begins the accumulation of a CRC.

If a DLE should be included as part of the data the DLE is decoded and provides the positive voltage to the K input lead of flip-flop 102 causing flip-flop 100 of FIG. 5A to be reset by the next REOC pulse on the C input lead of flip-flop 102. On the second DLE, however, the voltage from the Q output lead of the DFS flip-flop 101 causes the enable CRC flip-flop 102 to be set when the next REOC pulse is applied to the C input lead. This causes flip-flop 102 to accumulate only a single DLE character into the RECV CRC generator 63 by inhibiting the RCV CRC CLOCK at gate 98; however, both DLE's are stored as normal data. The subchannel continues to store until it receives a DLE followed by an ITB. This DLE is not accumulated into the CRC, but the ITB is accumulated. The DLE flag signal from the Q output lead of flip-flop 100 is coupled through gates 74 and 78 of FIG. 4B to the J input lead of flip-flop 54 thereby setting the "end data field" flip-flop 54. The DLE flag signal is also coupled through gates 75 and 79 causing the ITB flip-flop 55 to be set. At the end of the next character the REOC pulse and the voltage from the Q output lead of flip-flop 54 cause the store end character flip-flop 56 to be set. The ITB signal is coupled through register 61 and 62 to the receive buffer 65. The ITB signal is then transferred to the controller and is stored. On the next REOC pulse an RCV CRC check pulse is generated causing the CRC generator to be checked for a content of zero and causing the ITB restart flip-flop 57 to be set. When the ITB restart flip-flop 57 is set gate 131 of FIG. 5B is disabled so that the flip-flop 109 cannot be set and the sync character following the CRC is not stored.

The DLE character following the SYN characters enables gate 82 of FIG. 4B thereby resetting flip-flops 54, 56, 55, and 57. This removes the reset signal from flip-flops 58, 101, 102, 104, 105 and 106 and allows flip-flop 100 to set. When the following character, which is an STX, is decoded, flip-flop 101 of FIG. 5A is set by signal through gate 96 and 90. On the next REOC pulse flip-flop 102 is set thereby enabling the following characters to be accumulated into the CRC. This continues until the timer inserts a DLE, SYN which is detected by the subchannel. The DLE, SYN is not stored and is not accumulated into the CRC in the same manner as the SYN timer insertion in the nontransparent mode. Characters following the timer inserted characters are again stored and accumulated into the CRC until the DLE, STX are received. The DLE is not accumulated into the CRC because flip-flop 102 resets and then sets when the RTX is decoded.

When a combination of DLE, ETX has been detected the signal is coupled through gates 74 and 78 of FIG. 4B causing the end data field flip-flop 54 to be set. On the next REOC pulse flip-flop 56 is set and the ETX is loaded into the buffer 65 and is loaded through the controller into the memory. The next REOC pulse coupled through gate 81 provides a check pulse which sets the terminate character flip-flop 58 and the receive CRC error flip-flop 53 if an error is detected from the decode content register 52. For simplicity in describing the operation of the circuit all of the data fields in the above illustration have started with an STX and ended with an ETX. In some applications the SOH and the ETB characters are used interchangeably with the STX and ETX respectively.

WRAP-AROUND TESTING OF THE SUBCHANNEL

Since the subchannel is a full duplex device which is capable of sending and receiving data at the same time, signals from the controller to the configuration register may be used to configure the subchannel in a wrap-around mode. When the subchannel is configured in a receive mode, send mode, nontransparent and wrap-around modes, the test and diagnostic program supplies the nontransparent format E to the subchannel. The processor also stores an identical message as format E with the CRC checks following the ITB and the ETX and supplies a terminate status following the ETX. The subchannel expands the nontransparent format E into the expanded format B at the output lead of the send data output gate 199 and the receive logic then strips off all of the characters not comprising the heart of the message itself and stores the original format. The same holds true for the transparent format.

when the subchannel is configured in the transparent mode, the receive mode, the send mode and the wrap-around mode the transparent format C is supplied by the program to the subchannel. The subchannel then expands this format into the format A at the send data output gate 199 of FIG. 6A and the receive logic reduces it back to the original format C as the receive characters are stored. In prior art subchannels when an error occurs in either the transparent or nontransparent mode of the wrap-around operation it is difficult to isolate the failure to a specific area. For example, if a CRC error is detected by the receive logic, it is difficult to determine if the problem is in the receive CRC generator, the send CRC generator or if the data CRC character which was not detected or a CRC character which was not sent. The additional RCV logic bypass and the send logic bypass signals which are developed in configuration register 29 aid in isolating the error to a particular portion of the subchannel.

RECEIVE LOGIC BYPASS

The receive logic bypass bit which is stored in the configuration register 29, FIG. 4A, cause the flip-flops 54, 55, 56, 57, 58 of FIG. 4B, 100, 101, 102, 103, 104 of FIG. 5A, 105, 106 of FIG. 5B, and receive timer 111 of FIG. 5A all to be held reset. When the receive logic bypass signal is enabled, the subchannel goes into character synchronization on the second SYN character and stores all characters thereafter whether they are data characters, control characters or CRC characters until the receive mode is terminated by the computer program. With the receive logic bypass ON the subchannel is incapable of stripping any characters and stores all characters beginning with the second SYN character. Also it does not complete or check the CRC.

SEND LOGIC BYPASS

The send logic bypass signal which is stored in the configuration register 29 causes the flip-flops 185, 186, 187, 188, 189 of FIG. 6B, 239, 247 of FIG. 6C, and 285 of FIG. 6D to be held reset and also causes counters 283, 292, and 261 to be held reset. When the subchannel is configured in a send mode with the send logic bypass on, the subchannel is inhibited from generating the four leading SYN characters. It does not detect the end or start of data field, does not generate a CRC character and the timer is not enabled. It is only capable of sending those characters which the computer program has supplied to the send buffer 164.

When the subchannel is configured in the send, receive, receive logic bypass, send logic bypass and wrap-around modes it acts as a pipeline which transfers the characters being sent from a computer through the subchannel and back to the computer where the characters are stored in the memory. When the format G of FIG. 2 is loaded into the send logic portion of the subchannel it is stored as shown in format G with the exception that the first sync character is removed. This is a simple data integrity test which is used to verify the basic data handling control and registers both the send and receive logic. If the format of FIG. G is stored correctly in memory after passing through the subchannel then the subchannel would be configured for the following test.

Since the subchannel has been tested and it has been determined that the basic sending and receiving portions worked properly, the send logic bypass is now tested by leaving the send bypass off and having the receive logic bypass on. The configuration register 29 of FIG. 4A provides a receive mode signal, a send mode signal, a receive logic bypass signal and a wrap-around signal to the subchannel. The nontransparent format E of FIG. 2 is used with the subchannel and because the receive logic bypass is on, the subchannel will store format F in the computer memory if the send logic is working properly. If the data is not received in proper form, the leading sync character generator is not working properly. This logic includes the pulse shaper 242, flip-flop 247, sync counter 261, NOR-gate 278 and the input select switch 167. One second after the STX character is received, the send timer 283 should insert two additional SYN characters into the message. If the SYN characters are missing there is a malfunction in the send timer 283, the insert flag flip-flop 285, the DLE SYN counter 292, NOR-gate 278 or the input selector switch 167. The program from the processor would be set up so that the CRC computed by the send data logic would be checked by the program when it is stored as two data characters. If the CRC is incorrect the malfunction could be isolated to the send CRC generator 194 of FIG. 6A, the start flip-flop 186, the enable send CRC flip-flop 187, the data field end flip-flop 188 of FIG. 6B, the send CRC flip-flop 189, the CRC counter 220, the SYN character decoder 165, or the logic inhibit CRC clocks when the send timer inserts the two sync characters.

If the CRC is correct but the following sync characters are missing or incorrect the send sync flip-flop 247, the sync counter 261, the NOR-gate 278, or the input select switch 167 is at fault. At the end of the following data field, if the CRC is correct, the problem would be the logic circuits associated with the set inputs of flip-flops 186 and 187 of FIG. 6B.

When the subchannel is configured as above except the transparent mode is substituted for the nontransparent mode, format C is supplied to the send logic, format D should be stored in the memory. When the subchannel works correctly in the nontransparent format and a CRC error is detected following the ITB in the transparent format the DLE flip-flop 185, the send character decoder 165 or the enable send CRC flip-flop 185 may be at fault. If the CRC is correct but the timer insertion of the DLE SYN is incorrect the problem would most likely be in the "select B" logic of FIG. 6D or the select B gating at switch 167. When the send logic can detect the DLE, ETX combination in the send data field the following CRC should be correct. At this point all of the send logic has been verified as working correctly.

With the completion of the previous tests the send logic has been thoroughly checked and it has been determined that the receive logic can achieve character synchronization and can store the characters. With the subchannel configured in the receive, send, send logic bypass, wrap-around and nontransparent modes, the subchannel should be given format B. of FIG. 2 to send. The format would be presented completely as shown since the subchannel cannot generate leading sync characters or a CRC with the send logic bypass on. The CRC as given will be precomputed by the program with the CRC following the ITB to be correct and the CRC following the ETX to be deliberately incorrect.

When the nontransparent format B is sent to the receive logic, the sync characters should be removed so that the format E of FIG. 2 will be stored with a terminate character status after the ETX along with a CRC error at that point. If the leading sync characters are not removed the likely area of malfunction would be the SYN/DLE flip-flop 104 of FIG. 4A, the first inhibit flip-flop 105 of FIG. 4B, or the second inhibit flip-flop 106. If the subchannel reports a CRC following the ITB, the NOR-gate 125 of FIG. 4A, the NAND-gate 98, the NAND-gate 94, the DFS flip-flop 101, the enable CRC flip-flop 102, the receive CRC generator 63, or the decoder 52 would be most likely to be at fault. If the CRC or the following sync characters are stored as normal data AND-gate 81 or the ITB restart flip-flop 57 are at fault. If the subchannel does not report a CRC error at the end of the next data field the RCV CRC generator 63 of FIG. 4A, the decoder 52, the receive CRC error flip-flop 53, the end data field flip-flop 54, the store end character flip-flop 56, or gate 81 most likely have failed. If the terminate character status is not reported the terminate character flip-flop 58 is at fault.

If all of the previous tests have been run without error the subchannel should next be configured as above except in the transparent mode. This time format A will be provided by the program along with the deliberate CRC error following the DLE, ITB and a correct CRC following the DLE, ETX. If the subchannel is working correctly format C of FIG. 2 will be stored with a CRC error after the ITB and a terminate signal after the ETX. If the subchannel does not report a CRC error after the ITB, gate 74 is at fault. If the DLE, SYN are stored as data the gates on the input leads of flip-flops 104 and 105 may be at fault. This will probably cause a CRC error status to be reported following the ETX.

While the principles of the invention have now been made clear in an illustrative embodiment, there will be many obvious modifications of the structure, proportions, materials and components without departing from those principles. The appended claims are intended to cover any such modifications.

I claim:

1. A data communications subchannel having self-testing apparatus for use with a processor, and a communications controller, a source of message characters connected to said controller and a modem, said subchannel comprising:

send logic, said send logic being coupled to said controller;

send control logic;

means for selectively connecting said control logic between said modem and said send logic, said send control logic and said send logic transferring characters from said controller to said modem when said send control logic is connected between said modem and said send logic;

receive logic;

means for selectively connecting said receive logic to said send control logic in a wrap-around test mode;

switch means responsive to test mode control signals from said processor for selectively bypassing said send control logic and thereby test for possible defects in said send control logic in said wrap-around test mode;

receive control logic;

means for selectively connecting said receive logic between said modem and said receive control logic, said receive logic and said receive control logic transferring characters from said modem to said controller when said receive logic is connected between said modem and said receive control logic;

switch means responsive to test mode control signals from said processor for selecting bypassing said receive control logic and thereby test for possible defects in said receive control logic in said wrap-around test mode; and means for connecting said receive control logic to said controller.

2. A data communications subchannel as defined in claim 1 including:

first logic means for adding synchronizing characters to said message characters, said first logic means being coupled to said send control logic;

second logic means for removing synchronizing characters from said message characters, said second logic means being coupled to said receive control logic.

3. A data communications subchannel as defined in claim 1 including:

first means for using message characters in said send control logic to develop a first cyclic redundancy check, said first means being coupled to said send control logic; and second means for using message characters in said receive control logic to develop a second cyclic redundancy check, said second means being coupled to said send control logic.

4. A data communications subchannel as defined in claim 1 including:

first means for using message characters in said send control logic to develop a first cyclic redundancy check, said first means being coupled to said send control logic;

second means for using message characters in said receive control logic to develop a second cyclic redundancy check, said second means being coupled to said receive control logic; and means for comparing said first cyclic redundancy check with said second cyclic redundancy check.

* * * * *